United States Patent [19]

Machida

[11] Patent Number: 4,665,538
[45] Date of Patent: May 12, 1987

[54] BIDIRECTIONAL BARREL SHIFT CIRCUIT

[75] Inventor: Toshiaki Machida, Tokyo, Japan

[73] Assignee: NEC Corporation, Tokyo, Japan

[21] Appl. No.: 758,011

[22] Filed: Jul. 24, 1985

[30] Foreign Application Priority Data

Jul. 24, 1984 [JP] Japan .................................. 59-153603

[51] Int. Cl.[4] ............................................. G11C 19/00
[52] U.S. Cl. ...................................... 377/69; 377/70; 364/715
[58] Field of Search ....................... 377/54, 67, 70, 69, 377/74, 75, 77, 81; 364/715

[56] References Cited

U.S. PATENT DOCUMENTS

| 3,781,819 | 12/1973 | Geng et al. | 364/900 |
|---|---|---|---|
| 3,961,750 | 6/1976 | Dao | 364/715 |
| 4,122,534 | 10/1978 | Cesaratto | 364/900 |
| 4,282,581 | 8/1981 | Bondurant et al. | 364/715 |
| 4,338,675 | 7/1982 | Palmer et al. | 364/200 |
| 4,396,994 | 8/1983 | Kang et al. | 364/715 |
| 4,472,788 | 9/1984 | Yamazaki | 364/715 |
| 4,475,173 | 10/1984 | Talmi | 364/715 |
| 4,583,197 | 4/1986 | Chappell et al. | 364/715 |

FOREIGN PATENT DOCUMENTS 1134948  5/1983  U.S.S.R. .............................. 364/715

OTHER PUBLICATIONS

VLSI Systems by Mead & Conway, Addison-Wesley Publishing Co., Oct. 1980, pp. 157-162, "Barrell Shifter".
"High-Speed Shifter Array", by J. E. Gersbach, IBM Technical Disclosure Bulletin, vol. 21, No. 4, Sep. 1978, pp. 1379 and 1380.
"Algebraic/Logical Shift Matrix", by J. E. Gersbach, IBM Technical Disclosure Bulletin, vol. 23, No. 1, Jun. 1980, pp. 120-122.

Primary Examiner—John S. Heyman
Assistant Examiner—Karl Ohralik
Attorney, Agent, or Firm—Sughrue, Mion, Zinn, Macpeak & Seas

[57] ABSTRACT

A bidirectional barrel shift circuit includes an input switching circuit having a plurality of parallel input lines and the corresponding number of first and second signal line pairs associated to the respective input lines. This input switching circuit is operative to selectively connect each of the input lines to one line of the associated first and second signal line pair. There is also provided an output switching circuit connected to all the first and second singal lines and having output lines of the number corresponding to that of the input lines. This output switching circuit is operative to connect either the first signal lines or the second signal lines to the corresponding output lines. A barrel shift matrix is connected to the first and second signal lines and is controlled by a shift number controller so as to produce between the first and second signal lines a connection pattern sufficient for realizing a given shift number. A shift direction controller responds to a shift direction signal to control the input switching circuit so as to alternatively connect the input lines to selected one lines of the first and second signal lines and at the same time to control the output switching circuit so as to connect the other signal lines to the corresponding output lines.

8 Claims, 3 Drawing Figures

BIDIRECTIONAL BARREL SHIFT CIRCUIT

BACKGROUND OF THE INVENTION

1. Field of the Invention

The present invention relates to a barrel shift circuit for simultaneously shifting a plurality of parallel signals, and more particularly to such a circuit capable of executing a logical shift or an arithmetical shift in leftward and rightward directions.

2. Description of Related Art

In logical and arithmetical operations, the data or numerals consisting of a plurality of bits are frequently shifted. For such a shift operation, there has been heretofore used a barrel shift circuit as shown in FIG. 1. The barrel shift circuit shown is a cyclic shift type of four bit barrel shift circuit having four parallel input lines $1a$, $1b$, $1c$ and $1d$, which are in turn connected to four corresponding parallel output lines $2a$, $2b$, $2c$ and $2d$ through field effect transistors (hereinafter abbreviated to "FETs") $Q_1$ and $Q_9$, $Q_3$ and $Q_{11}$, $Q_5$ and $Q_{13}$, and $Q_7$ and $Q_{15}$. Furthermore, the input lines $1a$, $1b$, $1c$ and $1d$ are respectively connected through FETs $Q_6$, $Q_8$, $Q_2$ and $Q_4$ to the output terminals of the FETs $Q_5$, $Q_7$, $Q_1$ and $Q_3$ cyclically leftwardly shifted by two lines (bits), respectively. Also, the output terminals of the FETs $Q_1$, $Q_3$, $Q_5$ and $Q_7$ are connected through FETs $Q_{12}$, $Q_{14}$, $Q_{16}$ and $Q_{10}$ to the output lines cyclically leftwardly shifted by one line (bit). A shift number control line 3 is connected through an inverter 4 commonly to the gates of the FETs $Q_1$, $Q_3$, $Q_5$ and $Q_7$ and also directly in common to the gates of the FETs $Q_2$, $Q_4$, $Q_6$ and $Q_8$. Another shift number control line 5 is connected through another inverter 6 to the gates of the FETs $Q_9$, $Q_{11}$, $Q_{13}$ and $Q_{15}$ and directly to the gates of the FETs $Q_{10}$, $Q_{12}$, $Q_{14}$ and $Q_{16}$.

With the above arrangement, if the data of four bits inputted through the input lines $1a$–$1b$ are to be shifted leftwardly by one bit, logical control signals "0" and "1" are applied to the control lines 3 and 5, respectively. Consequently, the FETs $Q_1$, $Q_3$, $Q_5$ and $Q_7$ are turned on and the FETs $Q_2$, $Q_4$, $Q_6$ and $Q_8$ are maintained in the off condition. In addition, the FETs $Q_9$, $Q_{11}$, $Q_{13}$ and $Q_{15}$ are in the off condition and the FETs $Q_{10}$, $Q_{12}$, $Q_{14}$ and $Q_{16}$ are turned on. Therefore, the input line $1a$ is connected through the FETs $Q_1$ and $Q_{12}$ to the output line $2b$, the input line $1b$ is connected through $Q_3$ and $Q_{14}$ to the output line $2c$, and similarly, the inputs $1c$ and $1d$ are connected to the outputs $2d$ and $2a$, respectively.

As a result, assuming that the input line $1a$ is the least significant bit and the input line $1d$ is the most significant bit, the most significant bit is transferred to the least significant bit, and the other input bits are shifted leftwardly by one bit. Namely, the inputted data is cyclically shifted leftwardly by one bit.

In addition, for a two bit shift, logical signals "1" and "0" are applied to the control lines 3 and 5, respectively, and for a three bit shift, a logical signal "1" is applied to both the control lines 3 and 5.

The barrel shift circuit shown in FIG. 1 can shift the inputted data leftwardly as mentioned above. However, in order to execute a rightward shift, there has been required another barrel shift circuit different from that shown in FIG. 1. In addition, each bit signal of the inputted data has to be passed through two FETs in the case of the four bit barrel shift circuit shown in FIG. 1 and also through n FETs (where n is positive integer) in the case of a $2^n$ bit barrel shift circuit constructed similarly to the circuit of FIG. 1. Therefore, as the data length becomes longer, a longer time is required from the moment the data is inputted to the barrel shift circuit to the moment the shifted data is outputted from the barrel shift circuit. In other words, the barrel shift circuit is not suitable for processing data of a large bit number at a high speed.

For the purpose of eliminating this problem, there has been proposed another barrel shift circuit as shown in FIG. 2. The circuit shown comprises a barrel shift matrix 7 connected between four parallel input lines $8a$, $8b$, $8c$ and $8d$ and four parallel output lines $9a$, $9b$, $9c$ and $9d$. The barrel shift matrix 7 includes FETs $Q_{17}$ to $Q_{32}$ arranged in the form of a matrix consisting of four rows and four columns. The FETs $Q_{17}$, $Q_{21}$, $Q_{25}$ and $Q_{29}$ n the rightmost or first column are connected at one end thereof to the first or least significant bit input line $8a$. The FETs $Q_{18}$, $Q_{22}$, $Q_{26}$ and $Q_{30}$ in the second column are connected at one end thereof to the second input line $8b$, the FETs in the third column to the third line $8c$, and the FETs in the fourth or leftmost column to the fourth or most significant bit line $8d$. Furthermore, the FETs $Q_{17}$ to $Q_{20}$ in the uppermost or first row are connected at the other end thereof to the corresponding output lines $9a$ to $9b$, respectively. The FETs $Q_{21}$ to $Q_{24}$ in the second row are respectively connected at the other end thereof to the output lines $9b$, $9c$, $9d$ and $9a$ of columns cyclically shifted leftwardly by one column from the columns in which the FETs $Q_{21}$ to $Q_{24}$ are located. Similarly, the FETs $Q_{25}$ to $Q_{28}$ are connected at the other end thereof to the output lines $9c$, $9d$, $9a$ and $9b$, respectively, for a cyclical left shift of two bits, and the FETs $Q_{29}$ to $Q_{32}$ are connected at the other end thereof to the output lines $9d$, $9a$, $9b$ and $9d$, respectively, for a three bit cyclical left shift. All the FETs in each row have gates connected in common so that the FETs in the same row are simultaneously turned on and off by a shift number controller 10, which is in turn connected with shift number control lines 11 and 12. This shift number controller has two inverters 13 connected to the control lines 11 and 12 and four two-input NOR gates 14, 15, 16 and 17 whose outputs are connected to the gates of the FETs in the respective rows of the matrix 7, as shown in FIG. 1, so that the shift number signal supplied through the two control lines 11 and 12 is decoded to turn on all the FETs in the selected one of the four rows.

Now, if a leftward shift of one bit should be executed, logical signals "1" and "0" are inputted through the control lines 11 and 12, respectively. In response to such a shift number control signal, the controller 10 outputs the logical signal "1" from the NOR gate 15 and the logical signal "0" from the other NOR gates 14, 16, and 17. Therefore, the FETs $Q_{21}$ to $Q_{24}$ in the second column are turned on, and all the other FETs are maintained in the off condition. As a result, the input lines $8a$, $8b$, $8c$ and $8d$ are connected to the output lines $9b$, $9c$, $9d$ and $9a$, respectively, so that the inputted data shifted cyclically leftwardly by one bit.

In the barrel shift circuit as shown in FIG. 2, each bit signal of the inputted data is shifted and outputted by passing through only one FET. In other words, if a barrel shift circuit is constructed in accordance with the manner shown in FIG. 2, even if the data length to be processed is made longer, it is possible to shift the inputted data at a high speed since the inputted data passes through only one FET between the input and the output of the barrel shift circuit. However, again, a different barrel shift matrix circuit is required for a rightward shift, and therefore, the barrel shift circuit was inevitably of large scale.

In view of the above and in order to perform bidirectional barrel shift by means of only one barrel shift matrix, there has been proposed to locate a complement generator 31 before the shift number controller 10 as shown in dotted lines in FIG. 2.

In a cyclic shift operation, data of $2^m$ bits (where m=positive integer) shifted rightwardly n bits (where n=positive integer) is equivalent to the same data shifted leftwardly by the bit number corresponding to the 1's complement of the decimal number n (the complement of n in binary notation). For example, assuming that data of four bits "$X_3 X_2 X_1 X_0$" are shifted rightwardly by three bits, the shifted data is represented by "$X_2 X_1 X_0 X_3$". On the other hand, the decimal number "3" is "11" in binary notation, and the complement of the binary number "11" is "01" which corresponds to the decimal number "1". Therefore, if the data "$X_3 X_2 X_1 X_0$" is shifted leftwardly by one bit, the shifted data is "$X_2 X_1 X_0 X_3$", which is equivalent to the three bit rightwardly shifted data.

The complement generator 18 shown in FIG. 2 is operable to execute the above operation in response to a shift direction signal supplied to a control input 19 of the generator 18. Namely, when the shift direction signal indicates a left shift, the generator 18 output the shift number signal applied through input terminals 20 and 21, without any modification to the lines 11 and 12, respectively. On the other hand, when the shift direction signal requests a right shift, the generator 18 operates to calculate the 1's complement of the shift number signal applied through the input terminals 20 and 21, and then to supply the calculated complement to the lines 11 and 12.

In order to perform the above function, the complement generator 18 is mainly composed of inverters for inverting the inputted shift number signal of binary code and an adder for adding the binary number "1" to the inverted shift number signal of binary code. Therefore, the generator 18 requires a substantial number of elements and accordingly will inevitably be of large size.

As seen from the above, the barrel shift circuit incorporating the complement generator as shown in FIG. 2 can execute bidirectional barrel shift using only one barrel shift matrix. However, since the circuit requires an associated control circuit of a relatively large size, the barrel shift circuit is still large. In addition, it is not possible to execute a non-cyclic bidirectional barrel shift.

SUMMARY OF THE INVENTION

Accordingly, it is an object of the present invention to provide a new bidirectional barrel shift circuit which is free from the drawbacks of the aforementioned conventional barrel shift circuits.

Another object of the present invention is to provide a bidirectional barrel shift circuit which is capable of executing a barrel shift operation at a high speed and which can be assembled in a relatively small size.

A further object of the present invention is to provide such a barrel shift circuit which can be constructed either for cyclic shift or for non-cyclic shift.

The above and other objects of the present invention can be achieved by a bidirectional barrel shift circuit constructed in accordance with the present invention, which comprises an input switching circuit having a plurality of parallel input lines and a corresponding number of signal line means associated with the respective input lines, each of the signal line means being composed of a pair of first and second signal lines, the input switching circuit being operative to selectively couple each of the input lines to one line of the associated first and second signal line pair; an output switching circuit coupled to all the first and second signal lines and having output lines of a number corresponding to that of the input lines, the output switching circuit being operative to couple either the first signal lines or the second signal lines to the corresponding output lines; a barrel shift matrix coupled to the first and second signal lines and having a plurality of on-off switch means for selectively coupling between the first and second signal lines; a shift number controller (shift decoder) operable in response to a shift number signal to control the barrel shift matrix so as to produce between the first and second signal lines a switching pattern sufficient for realizing a barrel shift of the given shift number; and a shift direction controller operable in response to a shift direction signal to control the input switching circuit so as to selectively couple the input lines to one of the first and second signal lines and to control the output switching circuit so as to couple the other signal lines to the corresponding output lines. The input and output switching circuits may include a multiplexer means, respectively.

With the above arrangement, when the respective bits of the data inputted from the input lines are applied to the first signal lines by the input switching circuit (input multiplexer circuit), the respective bits are transferred in the barrel shift matrix from the first signal lines to the second signal lines which give the barrel shift of the shift bit number indicated by the shift number controller (shift decoder). The transferred bits on the second signal lines are fed to the corresponding output lines by the output switching circuit (output multiplexer circuit), with the result that the inputted data is leftwardly shifted. On the other hand, if the respective bits of the data inputted from the input lines are applied to the second signal lines by the input switching circuit, the respective bits are transferred in the barrel shift matrix from the second signal lines to the first signal lines which realize the barrel shift of the shift bit number selected by the shift number controller. The transferred bits on the first signal lines are fed to the corresponding output lines by the output switching circuit, resulting in a rightward shift of the inputted data. Accordingly, the leftward and rightward shifts can be selectively executed by controlling the input and output switching circuits so as to couple the input lines to the first lines and the output lines to the second signal lines, and vice versa.

In addition, since both the input and output switching circuits merely perform a switching operation, each of these circuits can be constructed of a switching transistor array. Therefore, in the case of the barrel shift circuit formed in a large scaled integrated circuit (LSI), the input and output switching circuits can be formed in the LSI with a pattern compatible to that of the barrel shift matrix and without substantial increase of the circuit area.

Furthermore, the inputted data is outputted by passing through the input switching circuit, the barrel shift matrix and the output switching circuit in this order. Namely, each bit signal of the inputted data is passed through only three elements, i.e., one switching element in the input switching circuit, one on-off switch means in the barrel shift matrix, and one switching element in the output switching circuit, so that a barrel shift can be performed at a high speed even with data of a large bit number.

In one embodiment of the barrel shift circuit in accordance with the present invention, the on-off switch means in the barrel shift matrix are arranged in the form of a matrix which has a plurality of rows and a plurality of columns corresponding to the first and second signal line pairs. Each of the on-off switch means in each row is connected at one end to the first signal line in the associated column, and at other end to the second signal line in the column leftwardly shifted from the associated column by a predetermined shift number which is the same within the same row but different among the other rows. Preferably, each of the on-off switch means if constituted of a field effect transistor having two electrodes connected to the corresponding first and second signal lines, and the field effect transistors in each row of the matrix are commonly connected at their control electrodes so that the transistors in the same row are simultaneously turned on.

Specifically, the shift number controller has a plurality of parallel control inputs to receive the shift number signal in binary code and to turn on all the on-off switch means in the column of the matrix which can realize shift in the amount indicated by the shift number signal.

Furthermore, the input switching circuit includes a first on-off switch means connected between each input line and the associated first signal line, and a second on-off switch means connected between each input line and the associated second signal lines. The first on-off switch means and the second on-off switch means are alternatively turned on by the shift direction controller. Also, the output switching circuit includes a first on-off switch means connected between each first signal line and the corresponding output line, and a second on-off switch means connected between each second signal line and the corresponding output line. The first on-off switch means and the second on-off switch means of the output switching circuit are alternatively turned on by the shift direction controller. In both the input and output switching circuits, preferably, the first on-off switch means are field effect transistors having commonly connected gates, and the second on-off switch means are field effect transistors having commonly connected gates.

The above and other objects, features and advantages of the present invention will be apparent from the following description of preferred embodiments of the invention with reference to the accompanying drawings.

DESCRIPTION OF THE PREFERRED EMBODIMENTS

Figure 3:
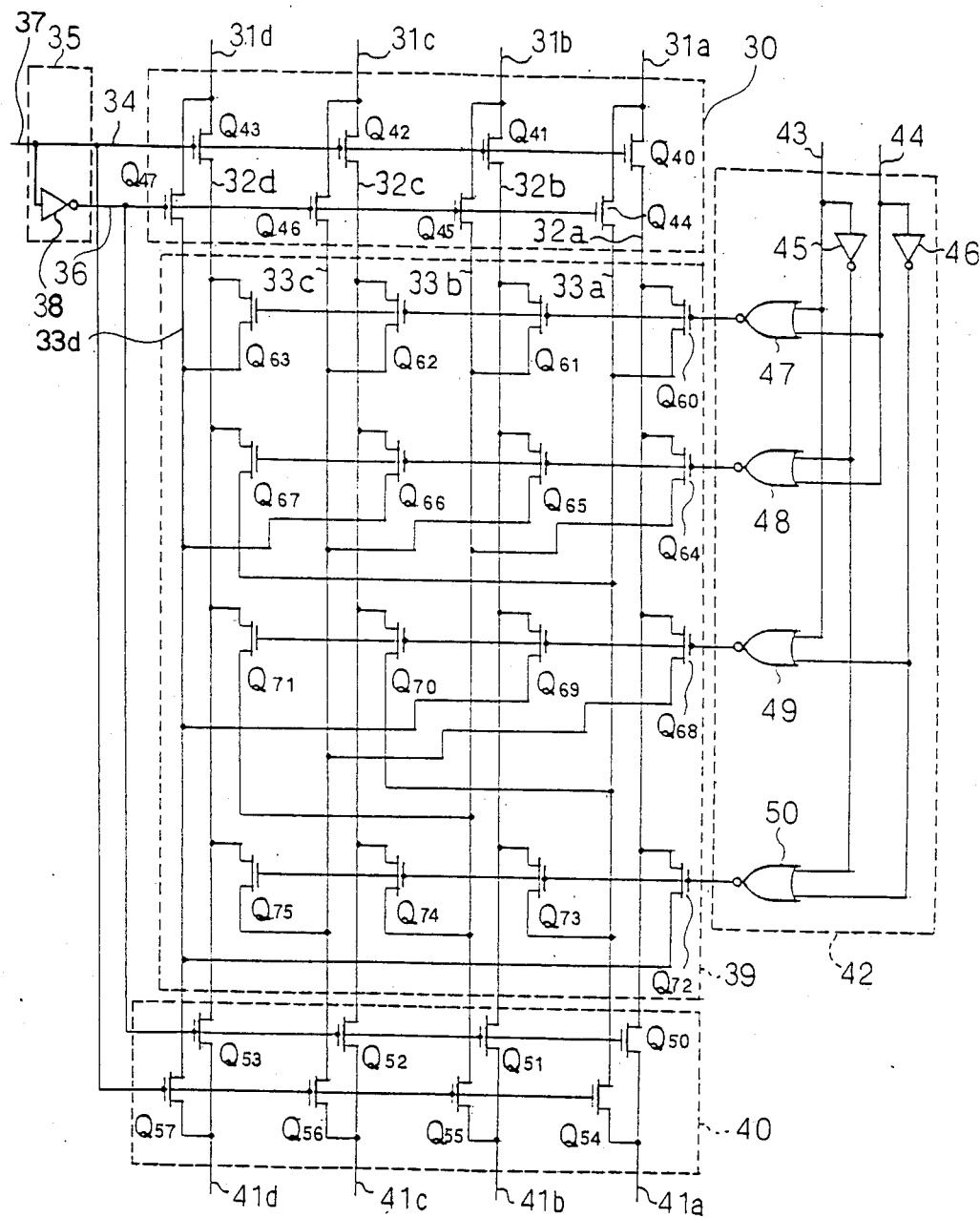
FIG. 3 is a circuit diagram of one embodiment of the bidirectional barrel shift circuit in accordance with the present invention.

Referring to FIG. 3, there is shown a circuit diagram of a cyclic shift type bidirectional barrel shift circuit in accordance with the present invention, which comprises an input multiplexer circuit or input switching circuit 30 including four input lines 31a, 31b, 31c and 31d. The input switching circuit 30 also includes four pairs of first and second signal lines 32a and 33a, 32b and 33b, 32c and 33c, and 32d and 33d, which correspond to the four input lines 31a, 31b, 31c and 31d, respectively. The input lines 31a–31d are respectively connected to the first signal lines 32a–32d through four FETs $Q_{40}$, $Q_{41}$, $Q_{42}$ and $Q_{43}$ whose gates are connected in common to a first output 34 of a shift direction controller 35. Further, the input lines 31a–31d are also respectively connected to the second signal lines 33a–33d through four FETs $Q_{44}$, $Q_{45}$, $Q_{46}$ and $Q_{47}$ whose gates are connected in common to a second output 36 of the shift direction controller 35. This shift direction controller 35 has an input 37 for receiving a shift direction signal. The input 37 is connected directly to the first output 34 and also connected to an input of an inverter 38 having an output connected to the second output 36.

The four pairs of signal lines 32a–32d and 33a–33d are connected through a barrel shift matrix 39 to an output multiplexer circuit or output switching circuit 40 which has four output lines 41a, 41b, 41c and 41d in correspondence to the four input line 31a, 31b, 31c and 31d, respectively. The four output lines 41a–14d are respectively connected to the first signal lines 32a–32d through four FETs $Q_{50}$, $Q_{51}$, $Q_{52}$ and $Q_{53}$ whose gates are connected in common to the second output 36 of the shift direction controller 35. The output lines 41a–41d are also respectively connected to the second signal lines 33a–33d though four FETs $Q_{54}$, $Q_{55}$, $Q_{56}$ and $Q_{57}$ which have gates connected in common to the first output 34 of the shift direction controller 35.

The barrel shift matrix 39 includes sixteen FETs $Q_{60}$ to $Q_{75}$ connected to the signal lines 32a–32d and 33a–33d in the form of a matrix which has four rows and four columns corresponding to the input lines. Each four FETs positioned in the each column are connected at one end thereof to the first signal line passing through the same column. Specifically, the FETs $Q_{60}$, $Q_{64}$, $Q_{68}$ and $Q_{72}$ positioned in the rightmost or first column are all connected at one end thereof to the first signal line 32a. The FETs $Q_{61}$, $Q_{65}$, $Q_{69}$ and $Q_{73}$ in the second column are connected at one end thereof to the first signal line 32b, FETs $Q_{62}$, $Q_{66}$, $Q_{70}$ and $Q_{74}$ are connected to the line 32c, and FETs $Q_{63}$, $Q_{67}$, $Q_{71}$ and $Q_{75}$ in the fourth or leftmost column are connected to the line 32d.

Furthermore, each four FETs positioned in each row are connected at other end thereof to the second signal line leftwardly shifted from the respective associated columns a predetermined shift number N which is an integer equal to or greater than 0 and which is the same within the same row but is different from that of the other rows. Specifically, the other ends of the FETs $Q_{60}$–$Q_{63}$ in the uppermost or first row are respectively connected to the second signal lines 33a–33d of the columns to which the FETs $Q_{60}$–$Q_{63}$ belong respectively. The other ends of the FETs $Q_{64}$–$Q_{67}$ in the second row are respectively connected to the second signal lines 33b, 33c, 33d and 33a positioned in the columns cyclically leftwardly adjacent to the columns in which the FETs $Q_{64}$–$Q_{67}$ are positioned, respectively. The FETs $Q_{68}$–$Q_{71}$ are connected to the second signal lines 33c, 33d, 33a and 33b, respectively, and the FETs $Q_{72}$–$Q_{75}$ in the lowermost row are connected to the second signal lines 33d, 33a, 33b and 33c, respectively.

Figure 1:
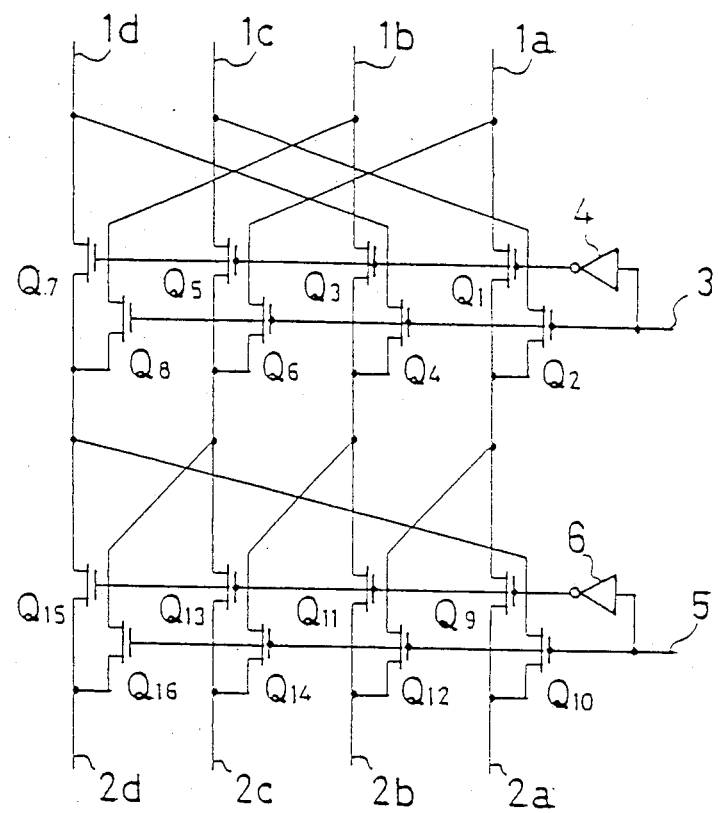
FIG. 1 is a circuit diagram of a conventional barrel shift circuit.
Figure 2:
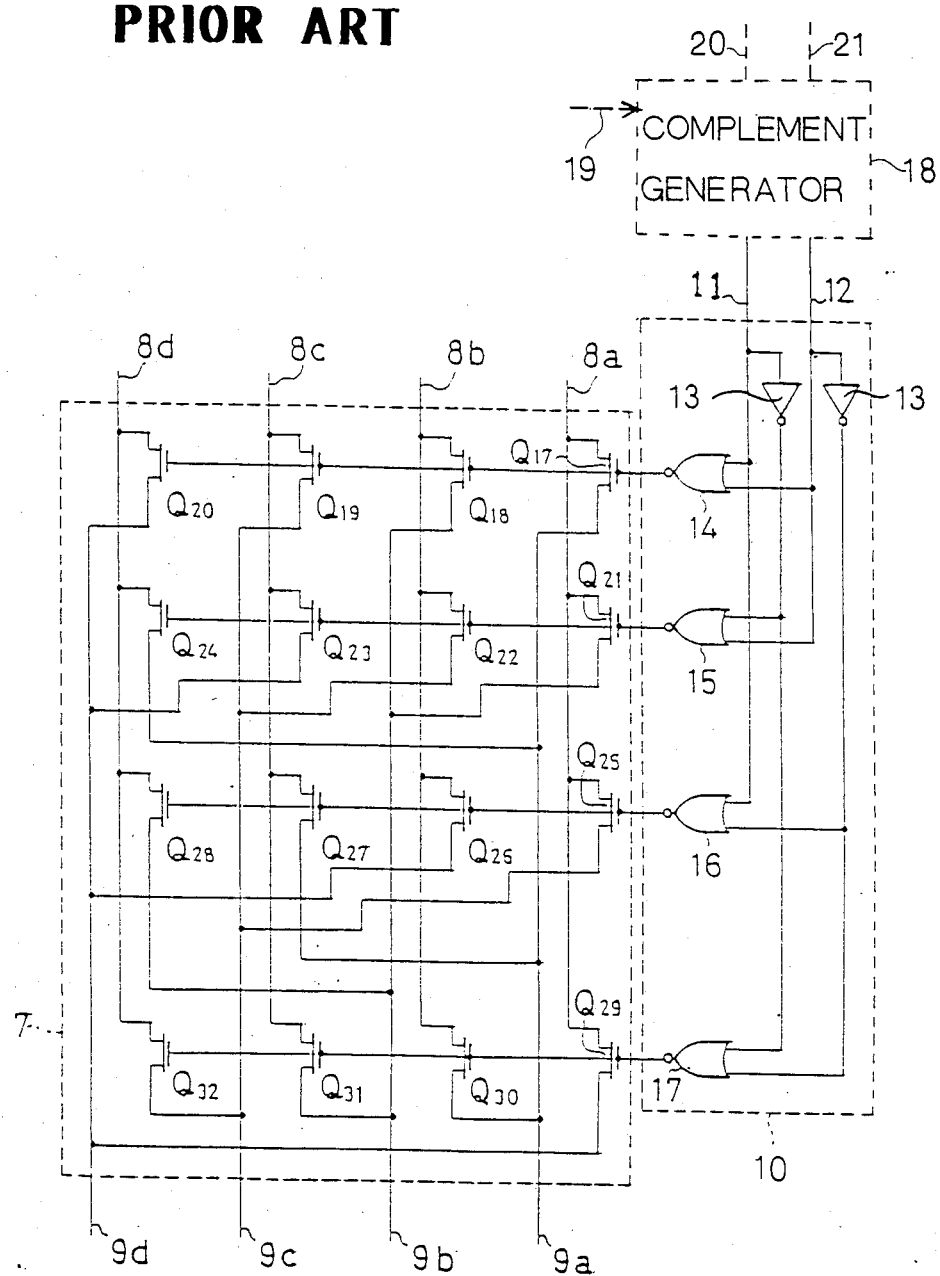
FIG. 2 is a circuit diagram of a conventional bidirectional barrel shift circuit.

Each four FETs in each row have gates connected in common to a shift decoder or shift number controller 42 similar to that shown in FIG. 2. This shift number controller 42 includes two control input lines 43 and 44 for receiving a shift number signal in binary code. These control input lines 43 and 44 are connected directly or through inverters 45 and 46 to four two-input NOR gates 47, 48, 49 and 50, as shown in FIG. 3, so that the shift number signal in binary code is decoded to selectively cause only one of the NOR gates to supply a high level signal. These NOR gates 47, 48, 49 and 50 are connected at their output to the commonly connected gates of the FETs in the corresponding rows of the barrel shift matrix 39.

The following table shows the relation of the signal level between the control inputs 43, 44 and the outputs of the NOR gates 47-50.

| Digit Number to be shifted | Control Lines | | Output of NORs | | | |
|---|---|---|---|---|---|---|
| | 43 | 44 | 47 | 48 | 49 | 50 |
| 0 | 0 | 0 | 1 | 0 | 0 | 0 |
| 1 | 1 | 0 | 0 | 1 | 0 | 0 |
| 2 | 0 | 1 | 0 | 0 | 1 | 0 |
| 3 | 1 | 1 | 0 | 0 | 0 | 1 |

The barrel shift circuit described above operates as follows:

For example, assume that a three bit left shift should be executed. At that time, a shift direction signal of the logical level "1" is applied to the input 37 of the shift direction controller 35, so that the output 34 is brought to the logical level "1" and the output 36 is brought to the logical level "0". Therefore, the FETs $Q_{40}$-$Q_{43}$ are turned on, and on the other hand, the FETs $Q_{44}$-$Q_{47}$ are maintained in the off condition. Further, the FETs $Q_{54}$-$Q_{57}$ are turned on and the FETs $Q_{50}$-$Q_{53}$ are in the off condition. As a result, the input lines 31a-31d are connected to the first signal lines 32a-32d, respectively, in the input switching circuit 30, and the second signal lines 33a-33d are connected to the output lines 41a-41d, respectively, in the output switching circuit 40.

In accordance with the above table, on the other hand, shift number signals on the logical level "1" are applied to both the control inputs 43 and 44 of the shift number controller. Accordingly, the output of the NOR gate 50 is brought to the logical level "1" so that the FETs $Q_{72}$-$Q_{75}$ in the matrix 39 are turned on, and the outputs of the other NOR gates 47-49 are kept at the logical level "0" so as to maintain all the other FETs $Q_{60}$-$Q_{71}$ of the matrix 39 in the off condition. Thus, the first signal lines 32a, 32b, 33c and 33d are respectively connected to the second signal lines 33d, 33a, 33b and 33c through the FETs $Q_{72}$, $Q_{73}$, $Q_{72}$ and $Q_{75}$. As a result, the input line 31a is connected to the output line 41d through the FETs $Q_{40}$, $Q_{72}$ and $Q_{57}$. Similarly, the input line 31b is connected to the output line 41a through $Q_{41}$, $Q_{73}$ and $Q_{54}$, the input 31c to the output 41b through $Q_{42}$, $Q_{74}$, $Q_{55}$, and the input 31d to the output 41c through $Q_{43}$, $Q_{75}$, $Q_{56}$. Namely, the inputted data "$x_3 x_2 x_1 x_0$" is shifted leftwardly by three bits, and the shifted data "$x_0 x_3 x_2 x_1$" is outputted from the barrel shift circuit.

Next, assuming that a one bit right shift should be executed, a shift direction signal of the logical level "0" is applied to the input 37 of the shift direction controller 35, so that the output 34 is brought to the logical level "0" and the output 36 is brought to the logical level "1". Therefore, the FETs $Q_{44}$-$Q_{47}$ are turned on, and on the other hand, the FETs $Q_{40}$-$Q_{43}$ are maintained in the off condition. Further, the FETs $Q_{50}$-$Q_{53}$ are turned on and the FETs $Q_{54}$-$Q_{57}$ are in the off condition. As a result, the input lines 31a-31d are connected to the second signal lines 33a-33d, respectively, in the input switching circuit 30, and the first signal lines 32a-32d are connected to the output lines 41a-41d, respectively, in the output switching circuit 40.

Further, shift number signals of the logical levels "1" and "0" are applied to the control inputs 43 and 44 of the shift number controller, respectively. Accordingly, the output of the NOR gate 48 is brought to the logical level "1" so that the FETs $Q_{64}$-$Q_{67}$ in the matrix 39 are turned on, and the outputs of the other NOR gates 47, 49 and 50 are kept at the logical level "0" so as to maintain all the other FETs $Q_{60}$-$Q_{63}$ and $Q_{68}$-$Q_{75}$ of the matrix 39 in the off condition. Thus, the second signal lines 33a, 33b, 33c and 33d are respectively connected to the first signal lines 32d, 32a, 32b and 32c through the FETs $Q_{67}$, $Q_{64}$, $Q_{65}$ and $Q_{66}$. As a result, the input line 31a is connected to the output line 41d through the FETs $Q_{44}$, $Q_{67}$ and $Q_{53}$. Similarly, the input line 31b is connected to the output line 41a through $Q_{45}$, $Q_{64}$ and $Q_{50}$, the input 31c to the output 41b through $Q_{46}$, $Q_{65}$, $Q_{51}$, and the input 31d to the output 41c through $Q_{47}$, $Q_{66}$, $Q_{52}$. Namely, the inputted data "$x_3 x_2 x_1 x_0$" is shifted rightwardly by one bit, and the shifted data "$x_0 x_3 x_2 x_1$" is outputted from the barrel shift circuit.

The aforementioned embodiment of the barrel shift circuit is of the cyclic shift type. However, if the FETs $Q_{67}$, $Q_{70}$, $Q_{71}$, $Q_{73}$, $Q_{74}$, $Q_{75}$ are omitted, the non-cyclic type barrel shift circuit can be realized. In such a case, it is preferable to automatically apply the logical level "1" or "0" to empty digits produced by the shifting operation.

The invention has thus been shown and described with reference to specific embodiments. However, it should be noted that the invention is in no way limited to the details of the illustrated structures but changes and modifications may be made within the scope of the appended claims.

I claim:

1. A bidirectional barrel shift circuit comprising:
   an input switching circuit having a plurality of parallel input lines and a corresponding number of signal line means associated with the respective input lines, each of the signal line means being composed of a pair of first and second signal lines, the input switching circuit being operative to selectively couple each of the input lines to one of the associated first and second signal line pair;
   an output switching circuit coupled to all the first and second signal lines and having output lines of a number corresponding to that of the input lines, the output switching circuit being operative to couple either the first signal lines or the second signal lines to the corresponding output lines;
   a barrel shift matrix coupled to the first and second signal lines and having a plurality of on-off switch means for selectively coupling between the first and second signal lines;
   a shift number controller operable in response to a shift number signal to control the barrel shift matrix so as to produce between the first and second signal lines a switching pattern which realizes a barrel shift of the given shift number; and a shift direction controller operable in response to a shift direction signal to control the input switching circuit so as to selectively couple the input lines to either the first or second signal lines and to control the output switching circuit so as to couple the other of the first and second signal lines to the corresponding output lines.

2. A barrel swift circuit as claimed in claim 1 wherein the on-off switch means in the barrel shift matrix are arranged in the form of a matrix which has a plurality of rows and a plurality of columns corresponding to the first and second signal lines pairs, each of the on-off switch means in each row being connected at one end to the first signal line in the associated column, and at the other end to the second signal line in the column leftwardly shifted from the associated column by a predetermined shift number which is the same within the same row but different from that of the other rows.

3. A barrel shift circuit as claimed in claim 2 wherein each of the on-off switch means is constituted of a field effect transistor having two electrodes connected to the corresponding first and second signal lines, the field effect transistors in each row of the matrix having commonly connected gate electrodes so that the transistors in the same row are simultaneously turned on.

4. A barrel shift circuit as claimed in claim 2 wherein the shift number controller includes a plurality of parallel control inputs for receiving the shift number signal in binary code and is operable to turn on all of the on-off switch means in that column of the matrix which can realize a shift in the amount indicated by the shift number signal.

5. A barrel shift circuit as claimed in claim 1 wherein the input switching circuit includes a first on-off switch means connected between each input line and the associated first signal line, and a second on-off switch means connected between each input line and the associated second signal lines, one of the first on-off switch means and the second on-off switch means being selectively turned on by the shift direction controller.

6. A barrel shift circuit as claimed in claim 5 wherein the first on-off switch means comprise field effect transistors having commonly connected gates, and the second on-off switch means comprise field effect transistors having commonly connected gates.

7. A barrel shift circuit as claimed in claim 1 wherein the output switching circuit includes a first on-off switch means connected between each first signal line and the corresponding output line, and a second on-off switch means connected between each second signal line and the corresponding output line, one of the first on-off switch means and the second on-off switch means being selectively turned on by the shift direction controller.

8. A barrel shift circuit as claimed in claim 7 wherein the first on-off switch means comprise field effect transistors having commonly connected gates, and the second on-off switch means comprise field effect transistors having commonly connected gates.

* * * * *

UNITED STATES PATENT AND TRADEMARK OFFICE
CERTIFICATE OF CORRECTION

PATENT NO. : 4,665,538
DATED : May 12, 1987
INVENTOR(S) : T. MACHIDA

It is certified that error appears in the above-identified patent and that said Letters Patent is hereby corrected as shown below:

COLUMN 2, LINE 15    After "Q29" delete "n" insert --in--;

LINE 59    After "data" insert --is--.

COLUMN 7, LINE 53    Delete "Q72" (second occurrence) and insert --Q74--;

LINE 68    Delete bold face type.

COLUMN 9, LINE 8    Delete "swift" insert --shift--.

Signed and Sealed this

Twenty-second Day of March, 1988

Attest:

DONALD J. QUIGG

Attesting Officer    Commissioner of Patents and Trademarks